June 26, 1951 H. E. WIMPERIS 2,558,530
SOIL AND MANURE SHREDDER AND DISTRIBUTOR
Filed Oct. 21, 1946 2 Sheets-Sheet 1

Inventor
HAROLD E. WIMPERIS

June 26, 1951        H. E. WIMPERIS        2,558,530
SOIL AND MANURE SHREDDER AND DISTRIBUTOR Filed Oct. 21, 1946        2 Sheets-Sheet 2

Inventor
HAROLD E. WIMPERIS

Patented June 26, 1951

2,558,530

UNITED STATES PATENT OFFICE 2,558,530

SOIL AND MANURE SHREDDER AND DISTRIBUTOR

Harold E. Wimperis, Minneapolis, Minn.

Application October 21, 1946, Serial No. 704,618

2 Claims. (Cl. 241—102)

My invention relates to a soil and manure shredder and distributor, and provides a wheel supported frame embodying a hopper for receiving soil, manure, rotted sod, and the like, together with shredding means at the lower part of the hopper, means for driving the shredding means and means for discharging from the hopper at its bottom as the entire apparatus is rolled over the ground, whereby the material fed to the hopper is not only thoroughly shredded and pulverized, but the pulverized material is spread in an even, thin layer over beds in greenhouses, gardens, and the like, and over lawns and other places where it is required to build up top soil and soil fertility.

Heretofore it has been customary to shred soil, sod, manure and the like at a single place and deposit it in piles from which it is conveyed by wheelbarrows, shovels, and the like, and spread by hand. Also, shredding means heretofore employed have differed from those of my invention and have been much less efficient for producing the desired shredding. In this old method, while the soil, manure or other material may be to a degree shredded and pulverized, the task of removing it from the accumulated pile and spreading it with any degree of evenness upon the surface where it is desired to be put, has proven very difficult. Among other things, after the shredding has been accomplished, the pulverized material in a pile tends to aggregate and when shoveled up forms lumps which have to be broken down by rakes, hoes, spades, or the like, and which produce material which is not and cannot be evenly spread over the surface where it is to be put, and which requires far more labor than if the material could be directly spread, as it is shredded.

It is the primary purpose of my invention to provide in a soil and manure shredder and distributor, a portable device comprising shredding means and means for actuating the shredding means. It is a further purpose to provide in a portable soil and manure shredder, means for thoroughly shredding the soil and/or manure and distributing it in a thin, even layer over lawns, gardens and the like.

It is a further object of the invention to provide in a soil and manure shredder, means for thoroughly pulverizing the soil and means for preventing damage to the shredding means from substances which are not easily pulverized.

It is a further object to provide in a soil shredder including a driven cylinder having outwardly extending projections, two independent rods carrying sets of projections which coact with the cylinder projections to shred soil and to selectively pass a non-shreddable object without dumping the remaining unshredded soil.

Other and further objects will be apparent from the detailed description of the apparatus.

Figure 2:
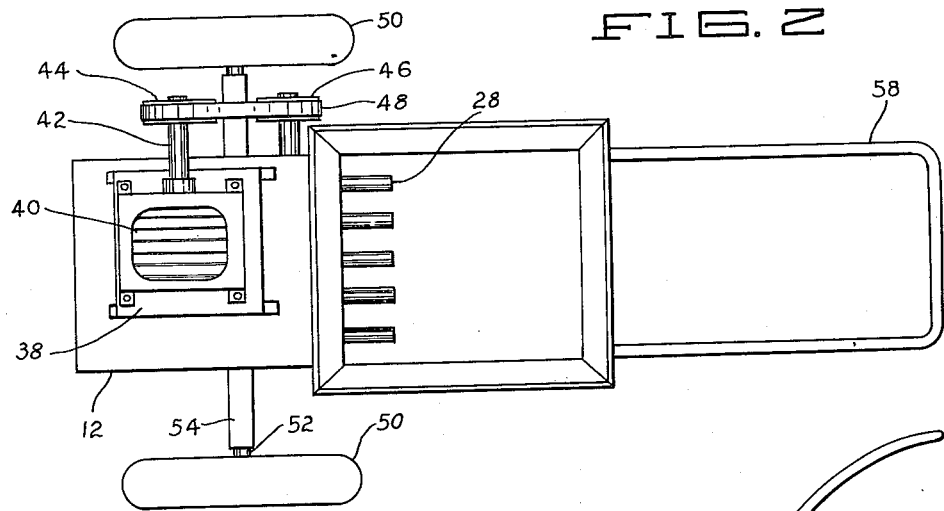
Fig. 2 is a top plan view of the apparatus.
Figure 1:
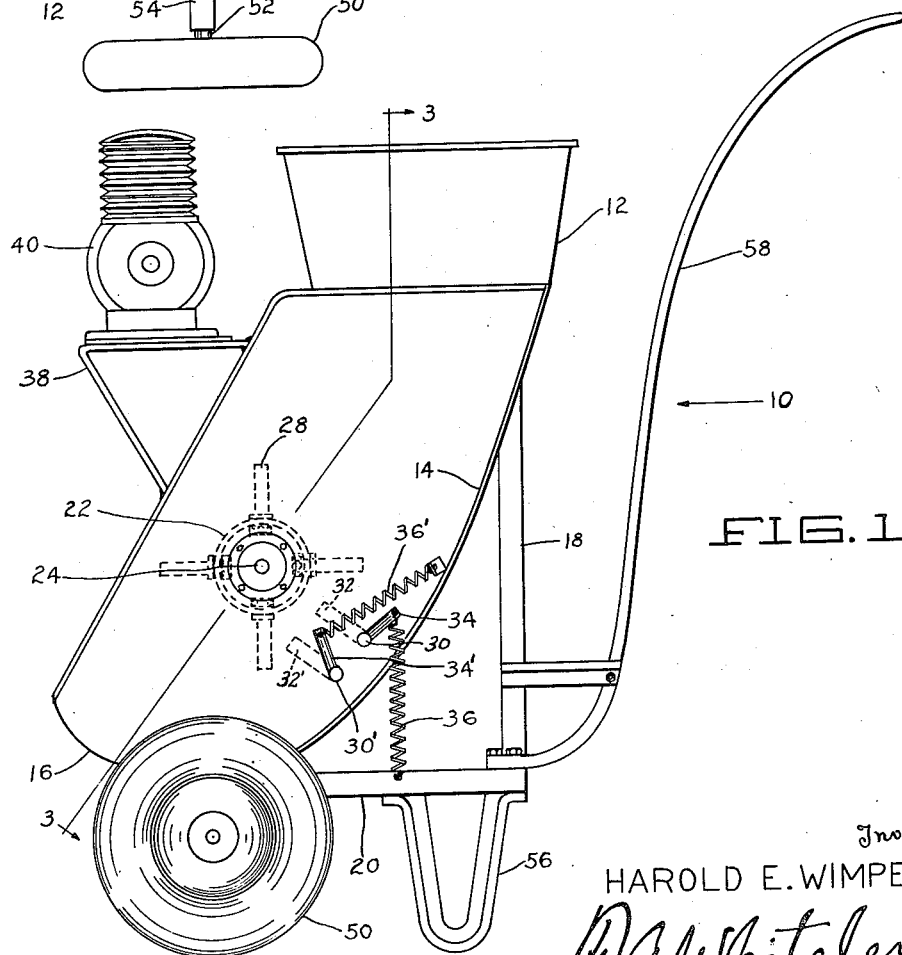
Fig. 1 is a sectional view in elevation of the soil an manure shredder and distributor.
Figure 3:
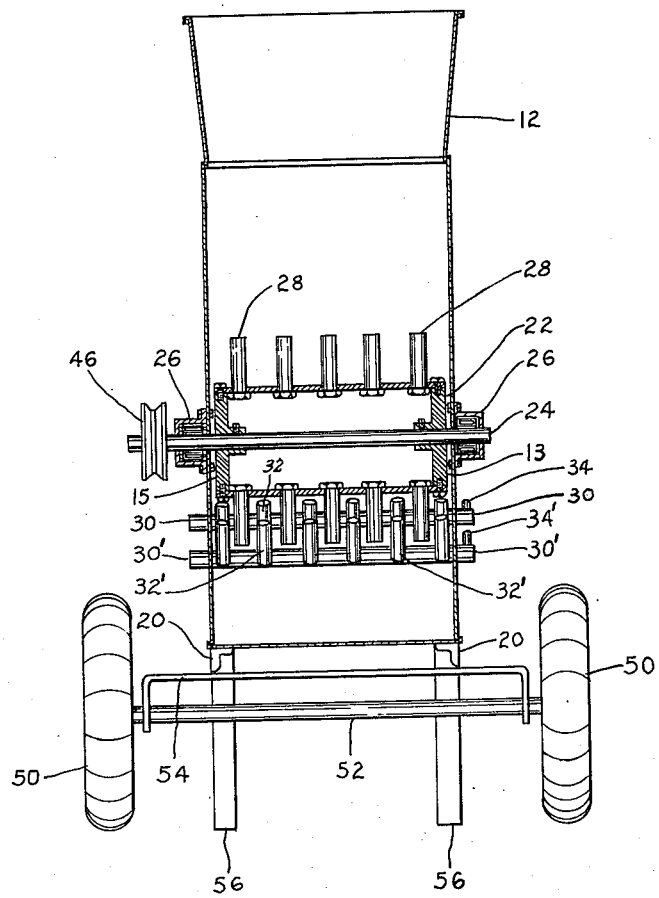
Fig. 3 is a sectional view taken on line 3—3 of Fig. 1.

Referring in detail to the drawings, 10 is the combined soil and manure shredder and distributor comprising a hopper 12 having its rear inner wall 14 curved inwardly and downwardly from its top toward the outlet 16 at its lower end. The hopper 12 is appropriately secured to a frame comprising spaced upright members 18 at the rear of the hopper and a horizontal bar 20 extending forwardly from the lower portion of each of the uprights 18.

A shredding cylinder 22 is mounted on a shaft 24 positioned in the lower portion of the hopper 12 and the ends of the cylinder 22 are closed by plates 13 and 15. The ends of the shaft 24 are mounted in bearing members 26. A plurality of projections or fingers 28 are appropriately fastened in rows to the periphery of the cylinder 22.

At one side of the cylinder 22 and slightly below its central axis are provided means which cooperate with the cylinder 22 for shredding soil and for selectively passing non-shreddable objects. A first rod 30 is journaled in the sides of the hopper and carries a set of fingers or projections 32 which are positioned in staggered relationship with the fingers or projections 28 on the cylinder 22. An arm 34 is secured on an outer end of the rod on the outside of the hopper and at its other end is connected to a spring 36 whose other end is secured to the frame 20. Slightly below rod 30 is a second rod 30' which is also journaled in the sides of the hopper and which carries a plurality of fingers or projections 32' which are in alignment with the projections 32 on the rod 30. Rod 32' also has an arm 34' on the outside of the hopper which at its outer end is connected to a spring 36' whose other end is connected to the side of the hopper. The function of the two rods 30 and 30' and their respective projections 32, 32' is to cooperate with the projections 28 on the cylinder 22 to shred soil disposed in the hopper. When an unshreddable object, such as a stone, is contained within the soil it will lodge between the projections 28 on the cylinder and the projection 32 on the uppermost rod. Rotation of the cylinder will cause rod 30 to rotate on its axis and if the stone or object is relatively small it will be disposed on the fingers 32' inwardly of their outer ends and adjacent the axis of rod 30'. If, however, the stone is relatively large in size, the fingers 32 on moving downwardly will engage the fingers 32' to cause rods 30 and 30' to be rotated so as to permit the object, and a certain amount of soil, to pass without injury to the projections. However, rod 30 being independent of rod 30' will move back to its normal position under the influence of spring 36 to prevent a large quantity of the unshredded soil to pass the cylinder.

A support or platform 38 is secured to the front outside of the hopper 12 for mounting a power means 40 such as a gasoline engine. The engine 40 has a power shaft 42 upon the outer end of which is mounted a V-pulley 44. A V-pulley 46 is mounted on one end of the shaft 24 and a belt 48 is arranged to transmit power from the V-pulley 44 mounted on the end of the power shaft 42 of the engine 40 to the V-pulley 46 mounted on the shaft 24 of the shredding cylinder 22.

A pair of wheels 50, carried by a shaft 52 which is mounted in the ends of an angle bar member 54 which is secured to the front portions of frame members 20—20, provide means for rolling the shredder 10 over a lawn, garden, and the like. A support 56 for the shredder 10 is secured to the rear portion of each of the horizontal frame members 20.

A handle 58 is appropriately fastened to the frame members 18 and 20 which permits an operator to push or roll the shredding apparatus 10 over a lawn, garden, or the like.

The curved inside wall 14 of the hopper 12 aids in feeding the soil to be pulverized to the cylinder 22. An operator pushes the shredder 10 by means of the handle 58 and the wheels 50 permit the shredder to be rolled over a lawn, garden, or the like, and the soil being forced between the fingers 28 of the cylinder 22 and the fingers 32 on the rods 30 is then dispensed in a steady, even stream, out of the opening 16 in the lower end of the hopper 12 and is evenly distributed over a lawn, garden, or the like to increase its fertility.

The soil shredder and distributor 10 will completely pulverize soil and evenly distribute it over lawns, gardens and the like at a great saving in cost and time. The apparatus not only shreds the soil and/or manure, but immediately distributes it to a lawn in a pulverized condition. The shredder and distributor 10 is easily and efficiently operated.

What I claim as new is:

1. In a soil shredder, a hopper formed of aligned side walls, a front wall and a rear wall forming an upper inlet and a lower outlet, a driven cylinder within said hopper and spaced upwardly from the outlet, a series of projections extending axially outwardly from the cylinder, a first rod journaled in the sides of the hopper on one side of the cylinder, a series of projections carried by said rod and extending in staggered relationship between the projections on the cylinder, a second rod journaled in the sides of the hopper below the first named rod, a series of projections carried by said second rod which are in alignment with the projections on the first named rod, the projections on each of said rods coacting with the projections on the cylinder to shred material disposed in said hopper, each of said rods being adapted for axial rotation when a non-shreddable object is lodged between the projections of said rod and the projections on the cylinder, said second named rod being spaced below the first named rod for a distance whereby rotation of the first named rod will project a small non-shreddable object in the direction of the axis of the second named rod, and independent resilient means connected to each of said rods for biasing the same against rotation whereby the first named rod will return to its normal position prior to the rotation of the second named rod to preclude the passage of unshredded material.

2. In a soil shredder, a hopper formed of aligned side walls, a front wall, and a rear wall which extends downwardly and forwardly in a sloping curve to form an outlet with the remaining walls at the lower forward end of the hopper, a driven cylinder within said hopper and spaced upwardly from the outlet, a series of projections extending axially outwardly from the cylinder, a first rod journaled in the side walls of the hopper below the axis of the cylinder, a series of projections carried by said rod and extending in staggered coacting relationship with the projections on the cylinder, a second rod journaled in the side walls of the hopper below the first named rod and inwardly of the axis of the first named rod, a series of projections carried by said second named rod, which are in alignment with the projections of the first named rod, the projections on each of said rods coacting with the projections on the cylinder to shred material disposed in said hopper, said second named rod being spaced from the first named rod whereby rotation of the first named rod by a large non-shreddable object will effect engagement of the projections on each of said rods and effect rotation of both of said rods to permit passage of the non-shreddable object, and independent means for biasing each of said rods against axial rotation to limit the passage of non-shreddable material relative to the cylinder.

HAROLD E. WIMPERIS.

REFERENCES CITED

The following references are of record in the file of this patent:

UNITED STATES PATENTS

| Number | Name | Date |
|---|---|---|
| 368,945 | Hancock | Aug. 30, 1887 |
| 509,933 | McConnell | Dec. 5, 1893 |
| 746,713 | Langston | Dec. 15, 1903 |
| 961,506 | Lokey | June 14, 1910 |
| 1,200,384 | Marquette | Oct. 3, 1916 |
| 1,936,025 | Mahaffey | Nov. 21, 1933 |
| 2,068,450 | Eberly | Jan. 19, 1937 |
| 2,416,432 | Brady | Feb. 25, 1947 |

FOREIGN PATENTS

| Number | Country | Date |
|---|---|---|
| 573,660 | Germany | Apr. 3, 1933 |
| 578,519 | Germany | June 14, 1933 |